Feb. 21, 1961  R. E. BALBACH ET AL  2,972,461
HOSE CLIP
Filed April 27, 1959
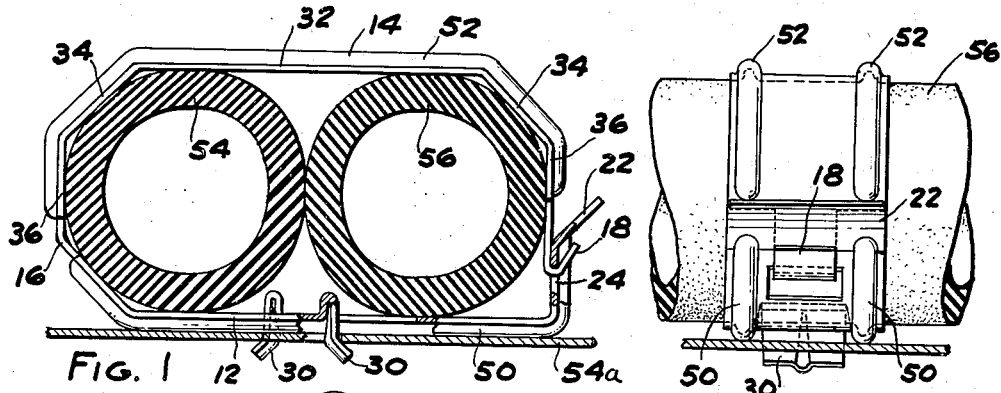
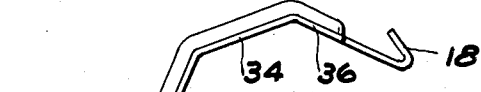
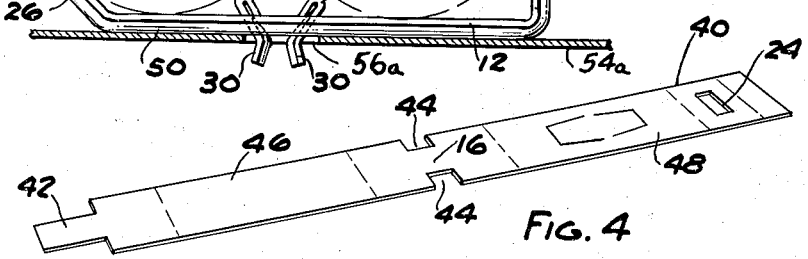
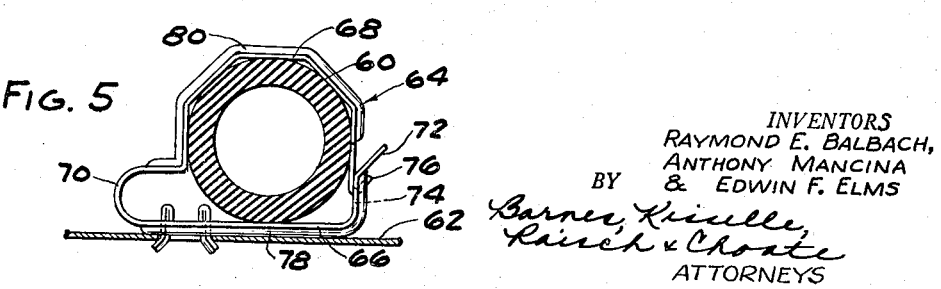
INVENTORS
RAYMOND E. BALBACH,
ANTHONY MANCINA
& EDWIN F. ELMS
BY
ATTORNEYS

# United States Patent Office 2,972,461
Patented Feb. 21, 1961

2,972,461
HOSE CLIP

Raymond E. Balbach, Huntington Woods, Anthony Mancina, Fraser, and Edwin F. Elms, Roseville, Mich., assignors to Robert L. Brown, Ferndale, Mich.

Filed Apr. 27, 1959, Ser. No. 809,201
3 Claims. (Cl. 248—68)

This invention relates to a hose clip and more particularly to a sheet metal clip for mounting rubber, plastic and other similar resiliently distortable conduits on a support panel.

In many machines such as automobiles, household appliances, etc., flexible rubber or plastic hoses are employed for conducting liquids and gasses. Usually, such hoses are secured to a support panel rather than having them hang loosely.

It is an object of this invention to provide a hose clip for securing such circumferentially flexible conduits to a support member, the clip being designed for economical manufacture, for easy application to the support member and so that the hoses can be secured to the support member in a very simple manner.

More specifically, the present invention contemplates a hose clip in the form of a strap formed of a relatively dead soft sheet metal. An intermediate portion of the strap is fashioned with lugs or other suitable means for attaching the strap member to a support panel. The strap is generally reinforced in an axial direction to provide two spaced sections of rigid shape connected by a readily bendable portion which permits bending the strap around one or more hoses. At its opposite ends, the strap is provided with interengageable latch members and the effective length of the strap is such that the hose or hoses enclosed by the strap must be circumferentially distorted in order to interengage the latch members. Thus, a resilience of the distorted hoses retains the latch members in interengaged position.

In the drawings:

Fig. 1 is a side elevational view partly in section showing the hose clip of the present invention and the manner in which it is used for securing a pair of circumferentially distortable hoses to a support panel.

Fig. 2 is a fragmentary end view of the assembly shown in Fig. 1.

Fig. 3 is a side elevational view of the hose clip of the present invention in the shape in which it is initially formed.

Fig. 4 is a perspective view of the blank from which the hose clip shown in Fig. 3 is formed.

Fig. 5 is a side elevational view, partly in section, of a modified form of hose clip according to the present invention and showing the manner in which it is employed for securing a single hose to a support panel.

Referring first to Fig. 3, the hose clip of the present invention is generally designated 10 and comprises a strap formed as a stamping having a base portion 12 and a hose encircling portion 14 connected together by an integral tab 16 of reduced width. The free end of the hose encircling portion 14 is formed with a hook 18 and the free end of base 12 is formed with an upstanding leg 20 terminating in an upwardly and outwardly inclined flange 22. The upstanding leg 20 is provided with an opening 24 therein with which hook 18 is adapted to engage.

The end of base 12 opposite the upstanding leg 20 is shaped into an outwardly inclined leg 26 which joins with tab 16. Intermediate its ends, base 12 has struck therefrom a pair of bendable lugs having portions 28 projecting above the plane of base 12 and angularly disposed portions 30 projecting below the plane of base 12.

The hose encircling portion 14 is fashioned with an intermediate straight portion 32 with downwardly and outwardly inclined portions 34 and 36 at the opposite ends thereof. Tab 16 is integral with the end of one of the downwardly inclined portions 36 and hook 18 forms an extension of the other downwardly inclined portion 36.

The blank from which the clip is stamped is illustrated in Fig. 4 and is designated 40. At one end, blank 40 is provided with an extension 42 from which the hook 18 is fashioned. Intermediate its ends, blank 40 is notched at each side thereof as at 44 to provide the integral tab 16 of reduced width. The portion 46 of the blank between extension 42 and notches 44 is shaped into the hose encircling portion 14 and the portion 48 of the blank between notches 44 and the opposite end thereof is shaped into the base 12.

Base 12 has embossed therein a pair of reinforcing ribs 50 which extend from the flange 42 to the tab 16. Likewise, the hose encircling portion 14 is embossed with a pair of reinforcing ribs 52 which extend longitudinally from the tab 16 to the hook 18. Ribs 50 and 52 impart rigidity to the shape of base 12 and hose encircling portion 14 so that the clip is distortable substantially only at the tab 16.

Base 12 and hose encircling portion 14 are dimensioned in length such that when a pair of hoses 54, 56 are positioned on base 12 between upstanding leg 24 and the inclined leg 26, the body encircling portion 14 cannot be swung downwardly about the tab 16 to engage hook 18 in the aperture 24 without distorting the normally circular shape of the hoses 54, 56. However, since these hoses, as previously indicated, are resiliently distorable, the hose encircling portion 14 can be swung downwardly to engage hook 18 with aperture 24 by causing the hoses to distort out of their circular shape as is illustrated in Fig. 1. When the hose encircling portion 14 is swung downwardly, the return bend of the hook 18 engages flange 22 so that the hook will be guided into the aperture 24. The portion 14 thereafter springs upwardly a slight amount to securely engage hook 18 in aperture 24. However, portion 14 does not swing upwardly a sufficient amount to permit the two hoses to assume their natural rounded shape. They remain distorted and their tendency to resume their original shape thus resiliently biases hook 18 into engagement with aperture 24.

The clip is adapted to be secured to a sheet metal panel such as illustrated at 54a by inserting the tabs 30 through an aperture 56a in the panel and thereafter bending the two tabs 28 toward one another from the position illustrated in Fig. 3 to that shown in Fig. 1 wherein the tabs 30 engage with the edge of the opening 56a to securely mount the clip on the panel. If desired, the clip can be mounted on a support panel by means other than the particular arrangement illustrated.

In Fig. 5, I have illustrated a clip similar to that illustrated in Figs. 1 through 3 that is designed for supporting a single hose 60 on a support panel 62. The hook generally designated 64 includes a base portion 66 and a hose encircling portion 68 interconnected by a bendable tab 70 of reduced width. As in the previous embodiment described, the free end of base 66 is provided with an outwardly inclined flange 72 and an aperture 74 with which a hook 76 at the free end of hose encircling portion 68 is adapted to engage. Base 66 and hose encircling portion 68 are provided with reinforcing ribs 78 and 80. Likewise, base 66 and hose encircling portion 68 are shaped and dimensioned such that in order to engage hook 76 with aperture 74, it is necessary to distort hose 60 from its normally circular cross section. In the clip illustrated, the perpendicular distance between the horizontally disposed portions of base 66 and hose encircling portion 68 is less than the outer diameter of the hose. The distorted shape of hose 60 resiliently retains hook 76 in engagement with aperture 74.

Thus, it will be seen that I have provided a clip for mounting one or more hoses on a support panel which can be manufactured economically from a soft, relatively non-resilient sheet metal, for example, plain cold rolled steel. The clip is characterized by the fact that even though it is formed of a normally non-resilient sheet metal, it is shaped such that it securely mounts the hoses on the support panel by utilizing the resilience of the hoses themselves for retaining the clip in the hose engaging position. This is assured by imparting rigidity to the shape of most of the clip and permitting only a selected portion of the clip to distort when it is wrapped around the hoses. Although the clip snugly embraces the encircled hose or hoses, the base and hose encircling portions are shaped to contact the outer surface of the hose or hoses only at circumferentially spaced areas and permit the areas in between to distort or bulge radially outwardly.

We claim:

1. A clip for securing one or more resilient, circumferentially distortable hoses to a support comprising a sheet metal strap having two longitudinally spaced portions connected by a relatively short portion which is readily bendable along a transverse line, each of said spaced portions being longitudinally ribbed so as to be relatively rigid, one of said ribbed portions having a straight section provided with means thereon for mounting the clip on a support, the other ribbed portion having a straight section, the length of which is less than the sum of the diameters of the hoses to be secured by the clip, said last mentioned straight section having at opposite ends thereof oppositely angularly inclined sections which terminate in parallel depending legs which are generally perpendicular to said last mentioned straight section and which are spaced apart a distance generally corresponding to the sum of the diameters of the hoses to be secured by the clip, the ends of said last mentioned legs remote from said last mentioned straight section being perpendicularly spaced from said last mentioned straight section a distance at least equal to the radius of the hoses to be secured by the clip, one of said parallel depending legs adjoining said readily bendable portion of the strap and the other having a latch member at the free end thereof, said first mentioned ribbed portion having at one end of the straight section thereof a portion adjoining said readily bendable portion of the strap and its opposite end extending upwardly from said last mentioned straight section and having a keeper thereon engageable by said latch member to retain said strap in the form of a closed loop, said two straight sections being spaced apart generally parallel a distance less than the diameter of the hoses to be secured by the clip when said latch and keeper members are interengaged, whereby when said two ribbed portions are closed around one or more hoses and said latch is engaged with said keeper, the hoses are compressed between said straight portions but are prevented from freely flattening by reason of engagement of the hoses with the parallel depending legs of the clip.

2. A clip as called for in claim 1 wherein the strap is formed of a relatively soft, non-resilient sheet metal.

3. A clip as called for in claim 1 wherein said latch member comprises a hook at the free end of said other of the parallel legs and said keeper member comprises an aperture in the upstanding end of the first mentioned ribbed portion.

References Cited in the file of this patent

UNITED STATES PATENTS

| 2,318,853 | Hall | May 11, 1943 |
| 2,553,883 | Tinnerman | May 22, 1951 |

FOREIGN PATENTS

| 406,968 | Germany | Dec. 8, 1924 |
| 485,462 | Great Britain | May 19, 1938 |
| 732,157 | France | June 6, 1932 |
| 899,968 | Germany | Dec. 17, 1953 |